(12) United States Patent
Wang et al.

(10) Patent No.: US 11,227,217 B1
(45) Date of Patent: Jan. 18, 2022

(54) ENTITY TRANSACTION ATTRIBUTE DETERMINATION METHOD AND APPARATUS

(71) Applicant: ALIPAY (HANGZHOU) INFORMATION TECHNOLOGY CO., LTD., Zhejiang (CN)

(72) Inventors: Daixin Wang, Hangzhou (CN); Zhiqiang Zhang, Hangzhou (CN); Jingli Fang, Hangzhou (CN); Quanhui Jia, Hangzhou (CN)

(73) Assignee: ALIPAY (HANGZHOU) INFORMATION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/358,039

(22) Filed: Jun. 25, 2021

(30) Foreign Application Priority Data

Jul. 24, 2020 (CN) .......................... 202010724053.3

(51) Int. Cl.
*G06F 40/00* (2020.01)
*G06N 3/08* (2006.01)
(Continued)

(52) U.S. Cl.
CPC ............. *G06N 3/08* (2013.01); *G06F 16/353* (2019.01); *G06N 3/049* (2013.01)

(58) Field of Classification Search
CPC .......... G06N 3/0454; G06N 3/08; G06N 3/04; G06N 20/00; G06N 3/0445; G06N 3/084;
(Continued)

(56) References Cited

U.S. PATENT DOCUMENTS 7,529,703 B2  5/2009  Benzschawel et al.
9,530,047 B1  12/2016  Tang et al.
(Continued)

FOREIGN PATENT DOCUMENTS

CN  104317822 A  1/2015
CN  104991899 A  10/2015
(Continued)

OTHER PUBLICATIONS

M. Carbonell, P. Riba, M. Villegas, A. Fornés and J. Lladós, "Named Entity Recognition and Relation Extraction with Graph Neural Networks in Semi Structured Documents," 2020 25th International Conference on Pattern Recognition (ICPR), 2021, pp. 9622-9627. (Year: 2021).*
(Continued)

*Primary Examiner* — Edgar X Guerra-Erazo (57) ABSTRACT

An entity transaction attribute determination method for determining an attribute state or an attribute category of a to-be-predicted entity on a preset transaction is provided. The method comprises obtaining a plurality of historical relational networks sequentially arranged under a temporal order; determining, for each of the historical relational networks and through vector fusion of neighbor nodes, a plurality of description vectors of the to-be-predicted entity; processing, through a pre-trained time-series neural network, the description vectors to obtain an output result; and determining, according to the output result, the attribute state or the attribute category of the preset transaction attribute for the to-be-predicted entity. The method improves the accuracy of predicting a preset transaction attribute of an entity through the analysis of the description vectors.

20 Claims, 5 Drawing Sheets

(51) Int. Cl.
*G06F 16/35* (2019.01)
*G06N 3/04* (2006.01)

(58) Field of Classification Search
CPC ........ G06N 3/02; G06N 3/0481; G06N 3/082; G06N 5/02; G06N 5/025; G06N 7/046; G06N 3/049; G10L 15/16; G10L 25/30; G10L 15/063; G10L 17/04; G10L 15/04; G10L 17/18; G10L 15/1822; G10L 15/1815; G10L 15/183; G10L 25/03; G10L 2015/088; G10L 19/04; G10L 15/05; G06F 40/30; G06F 30/27; G06F 16/35; G06F 40/289; G06F 17/18; G06F 16/3329; G06F 17/16; G06F 16/3344; G06F 40/295; G06F 40/58; G06F 9/466; G06F 40/211; G06F 40/205; G06F 2216/03; G06F 16/906; G06F 16/288; G06F 16/7867; G06F 16/90332; G06F 16/955; G06F 3/0237; G06F 16/2477; G06F 40/20; G06F 16/283; G06F 2212/454; G06F 16/65; G06F 16/353; G06K 9/629

See application file for complete search history.

(56) References Cited

U.S. PATENT DOCUMENTS

| | | | |
|---|---|---|---|
| 10,759,446 | B2 | 9/2020 | Motomura et al. |
| 10,977,655 | B2 | 4/2021 | Adjaoute |
| 10,984,423 | B2 | 4/2021 | Adjaoute |
| 2003/0220860 | A1 | 11/2003 | Heytens et al. |
| 2004/0225587 | A1 | 11/2004 | Messmer et al. |
| 2009/0287512 | A1 | 11/2009 | Bonissone et al. |
| 2011/0131166 | A1 | 6/2011 | Li et al. |
| 2015/0142713 | A1 | 5/2015 | Gopinathan et al. |
| 2015/0332295 | A1 | 11/2015 | Unser et al. |
| 2015/0332414 | A1 | 11/2015 | Unser et al. |
| 2015/0339769 | A1 | 11/2015 | Deoliveira et al. |
| 2016/0055427 | A1 | 2/2016 | Adjaoute |
| 2016/0086185 | A1 | 3/2016 | Adjaoute |
| 2017/0337481 | A1* | 11/2017 | Trouillon ................. G06N 7/00 |
| 2018/0018557 | A1 | 1/2018 | Esser et al. |
| 2018/0121788 | A1 | 5/2018 | Hashimoto et al. |
| 2019/0311428 | A1 | 10/2019 | Adjaoute |
| 2020/0293905 | A1* | 9/2020 | Huang ................... G06N 3/084 |
| 2021/0027116 | A1* | 1/2021 | Monaghan ........... G06K 9/6219 |

FOREIGN PATENT DOCUMENTS

| | | |
|---|---|---|
| CN | 105069041 A | 11/2015 |
| CN | 110009384 A | 7/2019 |
| CN | 111369258 A | 7/2020 |

OTHER PUBLICATIONS

W. Li, X. Zhang, Y. Wang, Z. Yan and R. Peng, "Graph2Seq: Fusion Embedding Learning for Knowledge Graph Completion," in IEEE Access, vol. 7, pp. 157960-157971, 2019. (Year: 2019).*

Y. Wang and Y. Li, "Fusing Distinguish Degree Neural Networks for Relational Classification," 2018 11th International Symposium on Computational Intelligence and Design (ISCID), 2018, pp. 323-328. (Year: 2018).*

M. Qi, W. Li, Z. Yang, Y. Wang and J. Luo, "Attentive Relational Networks for Mapping Images to Scene Graphs," 2019 IEEE/CVF Conference on Computer Vision and Pattern Recognition (CVPR), 2019, pp. 3952-3961. (Year: 2019).*

Kilias, T., Löser, A., Gers, F. A., Koopmanschap, R., Zhang, Y., & Kersten, M. (2018). Idel: In-database entity linking with neural embeddings. arXiv preprint arXiv: 1803.04884. (Year: 2018).*

First Search for Chinese Application No. 202010724053.3 dated Oct. 12, 2020.

* cited by examiner

ENTITY TRANSACTION ATTRIBUTE DETERMINATION METHOD AND APPARATUS

CROSS-REFERENCE TO RELATED APPLICATION

This application claims priority to and benefits of the Chinese Patent Application No. 202010724053.3, filed on Jul. 24, 2020, which is incorporated herein by reference in its entirety.

TECHNICAL FIELD

This specification is related to the field of computer technologies, and in particular, to an entity transaction attribute determination method and apparatus through computers.

BACKGROUND

Along with the development of computer technologies, assistance from computers is becoming increasingly indispensable for daily transaction processing. For example, on a shopping platform, computers may record the products browsed, clicked, and purchased by users to recommend products that may be more appealing to the users. In news APPs on terminals, the terminals may record the pages searched for and browsed by users, thereby recommend more suitable news articles for users. Various similar examples exist but are not elaborated further herein. Particularly, developing artificial intelligence technology has enabled computers to handle daily transactions more intelligently. For example, a shopping platform may predict a certain transaction attribute (such as gender) of a user to pitch to the user products that are suitable for the corresponding transaction attribute.

In exemplary applications, some transaction attributes of an entity being processed may be fixed, such as a gender transaction attribute of the user, while other transaction attributes may change under unexpected events. For example, an income transaction attribute of a user may change under events such as a job change, losing jobs, health status, etc. A finance-related overdue risk transaction attribute of a user will be subjected to a greater change upon events such as a change in occupation, a change of the family members of the user, and a switch of a loan platform of the user from a bank to a small loan company. Various similar examples exist but are not elaborated further herein.

Therefore, a solution is needed to integrate the influence of such unexpected events into an artificial intelligence-based prediction of entity transaction attributes to improve the prediction accuracy.

SUMMARY

One or more embodiments of this specification describe an entity transaction attribute determination method and apparatus, solving one or more technical problems mentioned in the Background section.

The first aspect of this specification is directed to an entity transaction attribute determination method for determining an attribute state or an attribute category of a to-be-predicted entity on a preset transaction attribute.

The method may include: obtaining a plurality of historical relational networks sequentially arranged under a temporal order. The historical relational networks may respectively correspond to historical time points having a preset time interval. Each of the historical relational networks may include a plurality of nodes, and each node may correspond to a plurality of entities comprising the to-be-predicted entity.

Each of the historical relational networks may be configured to describe association relationships between a plurality of entities that correspond to a corresponding historical time point, and the entities having an association relationship may be connected by a connecting edge therebetween. Each node may correspond to a node vector composed of transaction characteristics extracted based on descriptive information of the corresponding entities.

The method may further include determining, for each of the historical relational networks and through vector fusion of neighbor nodes, a plurality of description vectors of the to-be-predicted entity; processing, through a pre-trained time-series neural network, the description vectors to obtain an output result; and determining, according to the output result, the attribute state or the attribute category of the to-be-predicted entity on the preset transaction attribute.

In some embodiments, the time-series neural network may be trained by: obtaining a current training sample corresponding to a sample entity and an attribute tag of the sample entity regarding the preset transaction attribute; executing, for each historical relational network of T historical relational networks sequentially arranged under the temporal order, a node vector fusion operation of the neighbor nodes, to determine T description vectors respectively corresponding to the sample entity under the T relational networks, wherein T is an integer, and the T historical relational networks may be established under T time points having the preset time interval; sequentially inputting, under the temporal order of the corresponding historical relational networks, the T description vectors into a selected time-series neural network, and obtaining a sample output result of the time-series neural network for the sample entity; and adjusting, with the objective of matching the sample output result with the attribute tag, model parameters to train the time-series neural network.

In some embodiments, the transaction characteristics in the node vector corresponding to a single node may be extracted through descriptive information at a corresponding historical time point of a corresponding relational network, or extracted through descriptive information within a time interval between the corresponding historical time point and a previous historical time point of the corresponding relational network.

In some embodiments, the to-be-predicted entity may be a user. The entities in each of the historical relational networks may comprise a plurality of users and at least one of: an IP identifier or a WIFI identifier for a user device to access a network, and an application installed on the user device.

In some embodiments, the historical relational networks may include a first relational network. The to-be-predicted entity may correspond to a first node in the first relational network. The determining, for each of the historical relational networks and through vector fusion of the neighbor nodes, a plurality of description vectors of the to-be-predicted entity may include: processing the relational network through a multilayer graph neural network, the multilayer graph neural network updating, after processing of a current layer is done, the node vector of the first node based on a weighted result from a product of the node vector of each neighbor node updated by the previous layer and an auxiliary weight matrix; and using the node vector of the first node updated by the last layer of the graph neural network as a first description vector of the first node corresponding to the first relational network.

In some embodiments, the neighbor nodes of the first node may comprise a second node. At the current layer, a weight of the second node relative to the first node may be determined by: an exponential form-based normalization result of a similarity level between the node vector of the first node updated by the previous layer and the node vector of the second node updated by the previous layer, relative to a sum of similarity levels between the node vector of the first node updated by the previous layer and the node vector of each of the neighbor nodes updated by the previous layer.

In some embodiments, the similarity level between the node vector of the first node updated by the previous layer and the node vector of the second node updated by the previous layer is determined by: concatenating the node vector of the first node updated by the previous layer and the node vector of the second node updated by the previous layer to form a concatenation vector; performing, through a spatial auxiliary weight matrix, a dimensionality reduction process on the concatenation vector to obtain an intermediate vector having preset dimensions; and processing, through an auxiliary vector having the preset dimensions, the intermediate vector to obtain the similarity level between the node vector of the first node updated by the previous layer and the node vector of the second node updated by the previous layer.

Ins some embodiments, the output result may be an output vector. The determining, according to the output result, the attribute state or the attribute category of the to-be-predicted entity on the preset transaction attribute may comprises: processing the output vector through a fully connected neural network; and determining, through an obtained processing result, the attribute state or the attribute category of the to-be-predicted entity on the preset transaction attribute.

In some embodiments, the output result may be an output vector, the attribute states or attribute categories of the to-be-predicted entity on the preset transaction attribute may further respectively correspond to description vectors. The determining, according to the output result, the attribute state or the attribute category of the to-be-predicted entity on the preset transaction attribute may comprise: determining respective corresponding similarity levels between the output vector and each of the description vectors; and determining an attribute state or attribute category corresponding to a description vector having the highest similarity level as the attribute state or attribute category of the to-be-predicted entity on the preset transaction attribute during a preset time period.

Another aspect of this specification is directed to an entity transaction attribute determination apparatus for determining, through a plurality of historical relational networks based on a temporal order, an attribute state or an attribute category of a to-be-predicted entity on a preset transaction attribute. The apparatus may include: a determining unit, configured to obtain a plurality of historical relational networks sequentially arranged under a temporal order, wherein the historical relational networks respectively correspond to historical time points having a preset time interval; each of the relational networks comprises a plurality of nodes, each node corresponds to a plurality of entities comprising the to-be-predicted entity, each of the historical relational networks is configured to describe association relationships between a plurality of entities that correspond to a corresponding historical time point, the entities having an association relationship are connected by a connecting edge therebetween, and each node corresponds to a node vector composed of transaction characteristics extracted based on descriptive information of the corresponding entities; a fusion unit, configured to determine, for each of the relational networks and through vector fusion of the neighbor nodes, a plurality of description vectors of the to-be-predicted entity; a time-series data processing unit, configured to process, through a pre-trained time-series neural network, the description vectors to obtain an output result; and a prediction unit, configured to determine, according to the output result, the attribute state or the attribute category of the to-be-predicted entity on the preset transaction attribute.

Another aspect of this specification is directed to a computer-readable storage medium. The storage medium may have a computer program stored thereon. When the computer program is executed in a computer, the computer may be caused to execute the method of the first aspect.

Another aspect of this specification is directed to a computing device. The computing device may comprise a memory and a processor. Executable code may be stored in the memory. When executing the executable code, the processor may implement the method of the first aspect.

Another aspect of this specification is directed to an entity transaction attribute determination apparatus. The apparatus may include a processor and a non-transitory computer-readable memory coupled to the processor and configured with instructions executable by the processor to perform any of the entity transaction attribute determination methods described above.

Another aspect of this specification is directed to a non-transitory computer-readable storage medium. The storage medium may have instructions stored thereon executable by a processor to cause the processor to perform any of the entity transaction attribute determination methods described above.

Through the method and apparatus provided in the embodiments of this specification, on the one hand, description vectors of a to-be-predicted entity at different historical time points may be processed through a time-series neural network to consider time-series characteristics of the to-be-predicted entity. On the other hand, node vector aggregation of the neighbor nodes may be performed for the description vector of a single historical time point based on a relational network determined under entity states of a corresponding historical time point, fully exploring the influence of a neighbor entity on the current entity state, thereby generating a description vector having a better descriptive capability for users. Further, the accuracy of predicting entity transaction attributes is improved by processing the historical relational network having time-series characteristics.

BRIEF DESCRIPTION OF THE DRAWINGS

To describe the technical solutions in the embodiments of this specification more clearly, the following briefly describes the accompanying drawings required for describing the embodiments. Apparently, the accompanying drawings in the following description are some embodiments of this specification, and a person of ordinary skill in the art may further derive other accompanying drawings from these accompanying drawings without inventive efforts.

DETAIL DESCRIPTION OF THE EMBODIMENTS

Embodiments of this specification are described below with reference to the drawings.

Figure 1:
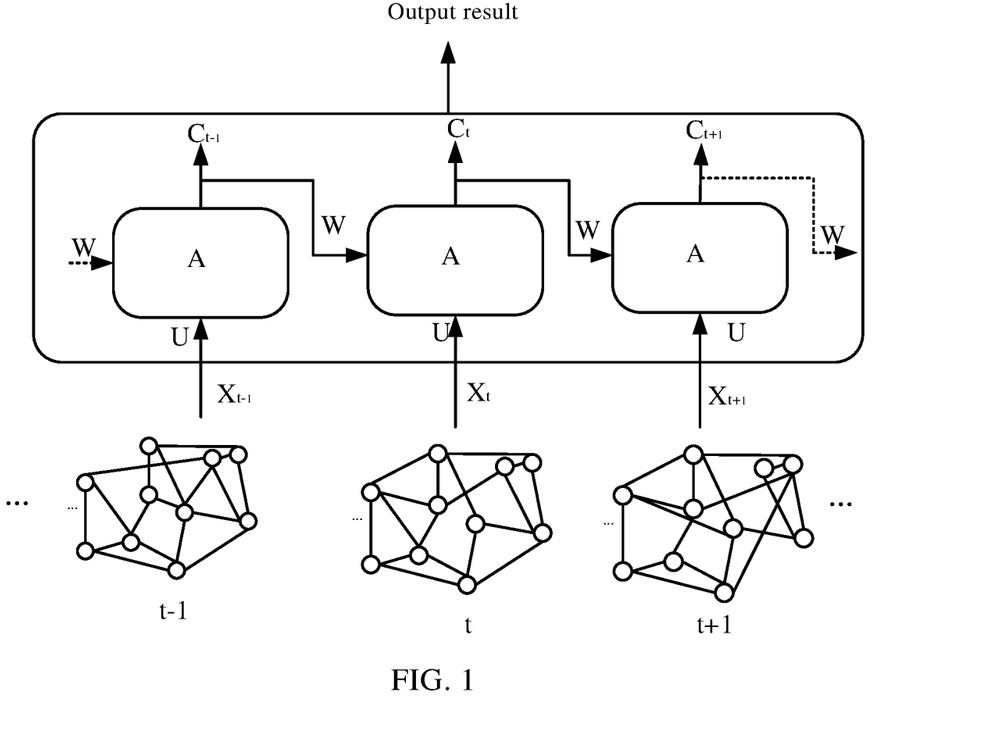
FIG. 1 illustrates a schematic diagram of an implementation architecture of this specification.

FIG. 1 illustrates a schematic diagram of an implementation architecture of this specification. As shown in FIG. 1, under the implementation architecture of this specification, a relational network may be pre-established with multiple time points as reference points. Nodes in the relational network may be various entities associated with an entity having a to-be-predicted transaction attribute.

For example, if the entity having a to-be-predicted transaction attribute is a user, the entities in the relational network may be multiple users and entities related to user devices. A user herein may refer to a virtual user (different from a biological person), for example, a terminal user, or a registered user of a network platform (website or APP). Generally, one user ID may correspond to one user. Such a user may typically interact with a server through a user device, so the user often relies on the user device to interact with the server. The entity related to the user device may reflect the characteristics of the user. That is, the entity is also associated with the user.

Similarly, the entity having a to-be-predicted transaction attribute may be another type of entity (e.g., a product, a customer service question and answer text, etc.). The characteristics of the entity having a to-be-predicted transaction attribute may also be described by other related entities (such as a customer, a merchant, a customer raising a customer service question, etc.) according to the exemplary application scenario. Therefore, under the technical concept of this specification, when a relational network is to be established, nodes in one-to-one correspondence with all entities comprising the entity having a to-be-predicted transaction attribute are provided, and nodes in one-to-one correspondence with other associated entities may be further provided.

The association relationships between the entities corresponding to the nodes may be represented by connecting lines between the nodes. Where the entity having a to-be-predicted transaction attribute is a user, other associated entities may include, but are not limited to, an application installed on a user device, an IP identifier, WiFi identifier, or communication base station identifier for a user device to access the Internet, an activity-related organization (e.g., a financial activity-related organization is a bank or a small high-interest loan company, etc.), and so on.

For each relational network, transaction characteristics of each entity may be extracted according to relevant descriptive information of the entity to describe the corresponding entity. In some embodiments, corresponding transaction characteristics of users may be extracted according to their gender, income, employer, consumer preferences, capital flow, and other descriptive information to form a node vector.

Corresponding characteristics for the IP identifier, WiFi identifier, or communication base station identifier for a user device to access the Internet may be extracted according to the geographic location information, the number of access users, and other descriptive information of the identifier to form a node vector. Corresponding transaction characteristics of an application installed on a user device may be extracted according to the download volume, release time, and application category (e.g., shopping, gaming, etc.), and other descriptive information to form a node vector. Corresponding transaction characteristics of an activity-related organization may be extracted according to the establishment time, user volume, asset category, scaled total asset number, organization category, and other descriptive information to form a node vector. Various similar examples exist but are not elaborated further herein.

In some embodiments, the vectors of various nodes may have uniform dimensions. For example, nodes corresponding to entities in different categories may respectively correspond to characteristics having the corresponding dimensions. The number of dimensions of each node vector may be a sum of the dimensions of each of the entity categories, and the node vector may include values in the corresponding dimensions. In one example, the number of entity categories may be 3, including the user, the APP, and the activity-related organization. If the transaction characteristics of the user is 5-dimensional, the transaction feature of the APP is 4-dimensional, and the transaction characteristics of the activity-related organizations is 3-dimensional, then the total number of dimensions for the transaction characteristics of the entity categories is 12. Here, each node may be represented by a 12-dimensional node vector. A single node may have meaningful characteristic values only in the corresponding dimensions. For example, a user may have characteristic values in the first 5 dimensions of the 12-dimensional node vector, and the last 7 dimensions all have a preset value (e.g., 0).

A plurality of description vectors of an entity requiring transaction attribute prediction may be determined by fusing characteristics of neighbor nodes in each relational network. Then, as shown in FIG. 1, description vectors arranged in a temporal order may be sequentially inputted into the time-series neural network to obtain an output result. The output result may correspond to a preset transaction attribute of a user.

The technical concept of this specification is described in detail below.

Under the technical concept of this specification, the involved technical problems may include the construction of a relational network, the vector fusion of neighbor nodes in a relational network, and the processing of each description vector by the time-series neural network. The following describes these technical problems and each of the implementation solutions to these problems.

First, the relational network involved in this specification may be constructed by collecting information of corresponding entities under time points having a preset time interval. The time points may be regarded as the time basis for data truncation. The preset time interval may be, for example, one month or one week, which is not limited in this specification.

The exemplary collected entity information may be various pieces of information at the current time point corresponding to the relational network or entity information during the time interval between the current time point and the previous time point. In some embodiments, for a physical APP related to a user device, a user download characteristic may be the total user downloads up to the corresponding time point, or the user downloads during the time interval between the corresponding time point and the previous time point. For a user, an occupation characteristic may be the occupation of the user at the corresponding time point, or various occupations which the user has taken up during a preset time interval before the corresponding time point. Various similar examples exist but are not elaborated further herein.

A corresponding relational network may be constructed through various entities related to the entity having a to-be-predicted transaction attribute. The nodes in the relational network may correspond to the entities in a one-to-one manner. A user may have an association relationship with entities such as other users, the APPs installed on the user device into which the user is logged, the WIFI address or IP address for accessing the Internet, and the like. The association relationship between entities may be represented by a connecting edge or may be represented by a preset identifier in a three-tuple. An n-tuple (n is a non-negative integer) may refer to a sequence (or ordered list) of n elements. Thus, a three-tuple may refer to a sequence (or ordered list) of three elements.

In some embodiments, the association relationship between a user entity and another user entity may be one determined by activities such as being a contact in the address book, performing a wire transfer, sending a red envelope, etc. When such an association relationship exists between two users, the two corresponding entities in the relational network may be connected by a connecting edge.

Figure 2:
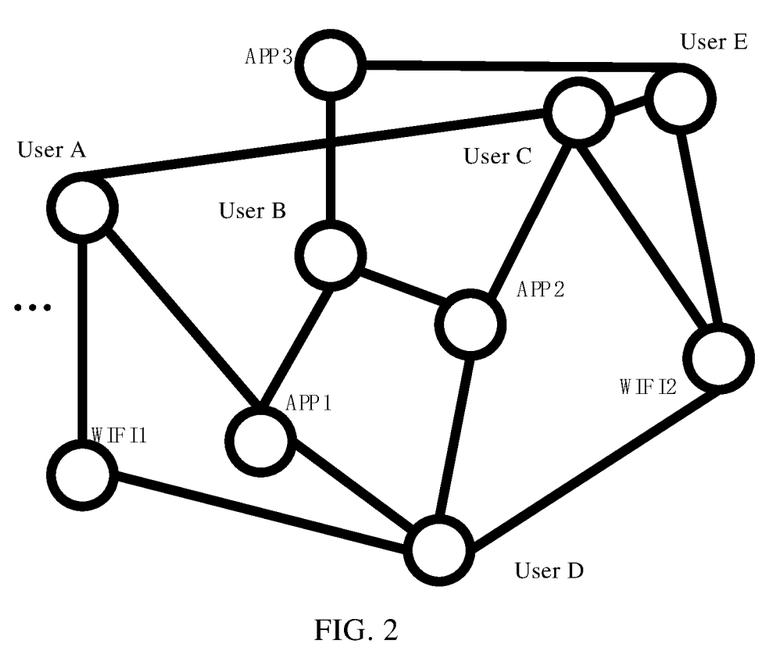
FIG. 2 illustrates a schematic diagram of a relational network according to some embodiments.

In FIG. 2, an entity with a to-be-predicted transaction attribute being a user is taken as an example, and a schematic diagram of a relational network corresponding to a time point is shown. In FIG. 2, the involved entities may include, but are not limited to: users, APPs associated with a user device, WIFI networks for a user device to access the Internet.

As shown in FIG. 2, user A has association relationships with user C, APP1, and WIFI1. User B has association relationships with APP1, APP2, and APP3. User C has association relationships with APP2, user E, user A, and WIFI2. User E has association relationships with user C, APP3, and WIFI2. User D has association relationships with APP1, APP2, WIFI1, and WIFI2. The relational network in FIG. 2 may describe the association relationships between the users and other entities. As an example, other associated entities in FIG. 2 include APPs and WIFI networks. Other associated entities may be various entities related to the to-be-predicted entity.

Each node may have corresponding descriptive information. The corresponding transaction characteristics may be extracted from the descriptive information to form a characteristic vector, which may be used as an initial node vector describing the corresponding entity.

For each of the time points with a preset interval, a corresponding relational network may be constructed to describe the association relationships between various entities. Each of the relational networks may have node vectors determined according to the current descriptive information of the corresponding entities. States of the entities at each of the time points arranged under a time interval may be characterized, thereby describing, in a temporal order, the states of the entity having a to-be-predicted transaction attribute at different times.

Second, vector fusion may be performed for vectors of neighbor nodes in an individual relational network. A node may have various associations with neighbor nodes, and such associations may reflect the implicit properties of the entity. In some embodiments, a user having an association relationship with a game APP may demonstrate the user's current interest in the game APP. Users interested in the game APP may share similar traits, such as being a student, being unemployed, having a stress-free occupation. The vector fusion of neighbor nodes fuses the information of the neighbor nodes for each node, thereby enhancing the descriptive capability of a node vector for a node.

In some embodiments, the node vectors of neighbor nodes within a preset order with respect to the current node may be fused together through methods such as a weighted average, a maximum value, etc., to obtain the neighbor fusion result, which may be further fused with the node vector of the current node. The obtained fusion vector may be the description vector of the current node. In practice, other methods may be used for the neighbor node fusion.

In some embodiments, the current node may be considered as its own neighbor node to perform the neighbor-node vector fusion.

In some embodiments, some nodes may be selected from neighbor nodes to perform the neighbor-node vector fusion.

In some embodiments, node vectors of neighbor nodes within a preset order with respect to the current node may be fused layer-by-layer in an iterative manner from the outermost layer to the innermost layer.

In some embodiments, the preset order may be 3, which means that the neighbor-node vector fusion may first be performed on the third-order neighbor nodes of the current node, and the node vectors of the third-order neighbor nodes after the fusion may perform neighbor-node vector fusion on the second-order neighbor nodes. Then, neighbor-node vector fusion may be performed on the first-order neighbor nodes. Finally, the node vectors of the first-order neighbor nodes with the neighbor-node vector fusion performed is fused with the current node.

In some embodiments, all nodes in the relational network may be traversed to perform node vector fusion of neighbor nodes on each nod, causing the current node vector of each node to be updated. After multiple iterations, the current node vector of the current node may be the description vector of the current node in the individual relational network.

Various similar examples exist but are not elaborated further herein.

In some embodiments, an individual relational network may be processed through a graph neural network (GNN), causing the node vector fusion of neighbor nodes to be performed on each node. For the graph neural network, each neural network layer means traversing each node in the relational network and updating the current node vector of each node as the fusion vector for the vectors of the neighbor nodes of the current node.

As an example, when the relational network is processed through a graph neural network, the (l+1)-th layer of the neural network may update the node vector of node u to be a function of a weighted result based on setting the weight of each neighbor node as an attention value:

$$h_u^{l+1} = f(\Sigma_{v \in N_u} \alpha(u,v) h_v^l W^l)$$

where $h_u^{l+1}$ represents the node vector of the node u after being updated by the (l+1)-th layer, $\alpha(u, v)$ represents the importance coefficient of the node v for the node u in the (l+1)-th layer of the graph neural network, $h_v^l$ represents the node vector of the node u after being updated by the l-th layer, $N_u$ represents a set of all or some (e.g., no more than 5) of the neighbor nodes of node u within a preset order (e.g., 1). Generally, the neighbor nodes may include node u itself, and $W^l$ represents the auxiliary weight matrix in the (l+1)-th layer of the graph neural network and may change the dimensions of the node vector. $W^l$ is a model parameter that may be determined by training the training samples.

In an individual relational network, considering that different neighbor nodes have different degrees of influence on the current node, the importance coefficient is used to distinguish the importance of each neighbor node for node u. In some embodiments, the node u may have the greatest influence on itself and may have a large importance coefficient. The importance coefficient of each neighbor node may be, for example, preset, or may be the similarity level between the description vector of the neighbor node and that of the current node. In an example, the importance coefficient of each neighbor node may be an attention value determined according to the similarity level between each of the neighbor node and the current node.

In some embodiments, the similarity between node v and node u may be represented by a similarity level. The importance coefficient of node v relative to node u ($\alpha(u, v)$) may be an exponential form-based normalization result of the similarity level between the node vector of node v and the node vector of node u relative to a sum of the similarity levels between the node vector of each neighbor node of node u and the node vector of node u. For example, the importance coefficient ($\alpha(u, v)$) may be:

$$a(u, v) = \frac{\exp(s(u, v))}{\sum_{j \in N_u} \exp(s(u, j))}$$

where s(u, v) represents the similarity level value between node u and node v. In one example, the similarity level value may be represented by a dot product of the respective node vectors corresponding to node u and node v. In another example, the similarity level value may be determined by:

$$s(u,v) = a^T \cdot W_{spatial}(h_u \| h_v)$$

where "$\|$" represents the concatenation of two vectors. $W_{spatial}$ represents an auxiliary weight matrix for the vector space and is used to reduce the dimensions of a vector or for mapping to the corresponding characteristic space having preset dimensions. A similarity level value may be obtained through processing the auxiliary vector $a^T$ by reducing the vector dimensions or mapping to the vector of the corresponding characteristic space, and $W_{spatial}$ and $a^T$ are model parameters that may be determined by training the training samples.

The transaction characteristics described by the node vectors in the multi-order neighborhood may be fused into the current node (node u) through the multilayer graph neural network, thereby obtaining a description vector having a better descriptive capability.

Further, for the relational network corresponding to each time point, one description vector of the entity having a to-be-predicted transaction attribute may be obtained. Since the time points are arranged a temporal order, respective description vectors may also have a corresponding temporal order.

Figure 3:
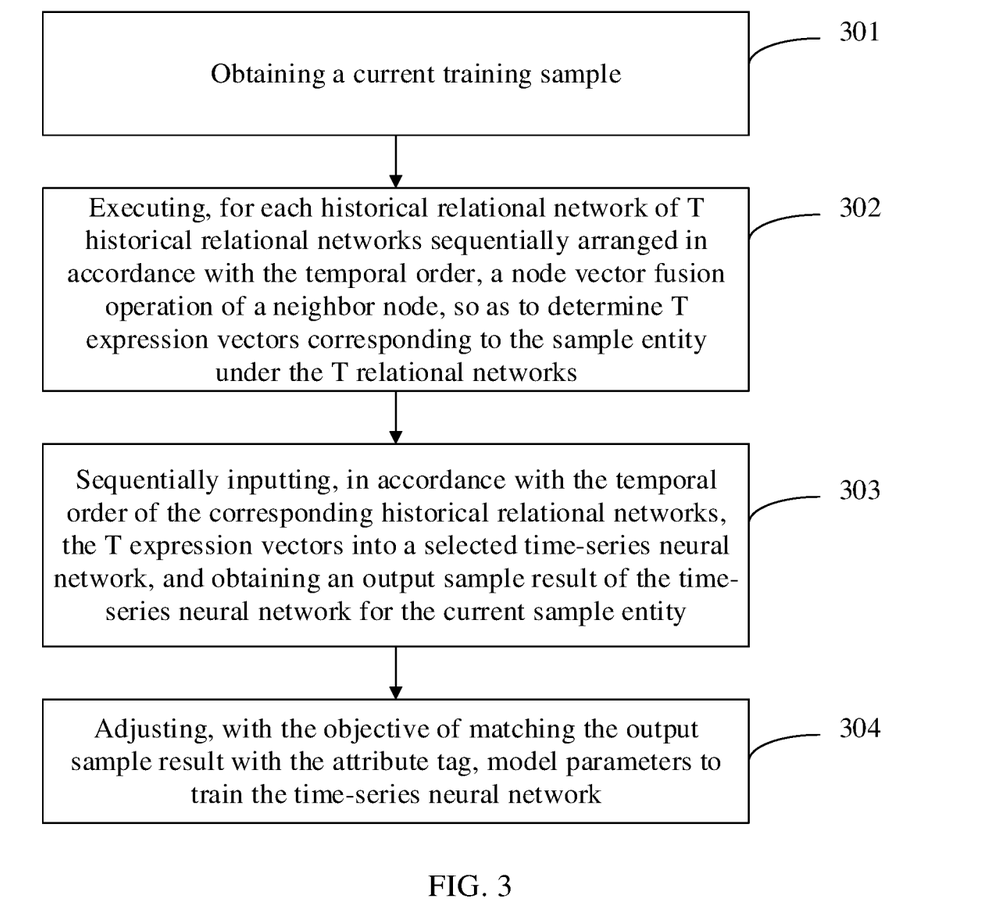
FIG. 3 illustrates a flowchart of a method for training a time-series neural network according to some embodiments.

Finally, each description vector may be processed by the time-series neural network. The time-series neural network may be a neural network for processing various data having a temporal order, such as a recurrent neural network (RNN). An RNN is a time-recursive neural network that may process sequential data. In RNNs, a current output of a sequence is related to the previous output. For example, an RNN memorizes and applies the previous information in the calculation of the current output (i.e., the nodes of the hidden layers are connected). The input for the hidden layers includes not only the output of the input layer but also the output of the hidden layers at the previous time instance. In the time-series diagram of the recurrent neural network in FIG. 3, the hidden layer state at the t-th iteration may be expressed as:

$$S_t = f(U^* X_t + W^* S_{t-1}),$$

where $X_t$ is the state of the input layer at the t-th iteration, $S_{t-1}$ is the state of the hidden layer at the (t-1)-th iteration, f is the calculation function, and W and U are the weights. The RNN loops the previous state back to the current input to take into account the influence of the historical input and therefore is suitable for a time-series data sequence.

In some embodiments, as shown in FIG. 1, the time-series neural network may be, for example, a Long Short-Term Memory (LSTM). For a neuron in an LSTM, at time instances of t−1, t, and t+1, the description vectors, arranged under an order, of the entity having a to-be-predicted transaction attribute in the corresponding relational network of the corresponding time period may be separately inputted. The description vectors may be respectively represented by $X_{t-1}$, $X_t$, and $X_{t+1}$. The states of the neuron at time instances of t−1, t, and t+1 may be respectively represented by $S_{t-1}$, $S_t$, and $S_{t+1}$. The outputs at time instances of t−1, t, and t+1 may be respectively represented by $C_{t-1}$, $C_t$, $C_{t-1}$, wherein:

$$S_t = g(U^* X_t + W^* C_{t-1} + b_s)$$

$$C_t = f(V^* S_{t-1} + b_c)$$

$$S_{t+1} = g(U^* X_t + W^* C_t + b_s)$$

$$C_{t+1} = f(V^* S_t + b_c)$$

where U, W, and V are weights.

In the LSTM model, the current state of each neuron may be jointly determined by the input at the current time instance and the output at the previous time instance. The current output of each neuron may be related to the state at the previous time instance. The description vectors of the entity at various time points may be analyzed using the LSTM model to selectively memorize information and perform data mining for long-range dependence.

The main technical problems and implementation solutions involved in the technical concept of this specification are described in detail above. The complete technical solutions will be described below with some embodiments.

FIG. 3 illustrates the process of training a time-series neural network according to some embodiments of this specification. The entity executing this process may be a computer, device, or server having certain computing capabilities. The model parameters in the time-series neural network may be adjusted by using multiple training samples to train the time-series neural network.

As shown in FIG. 3, the process of training the time-series neural network comprises the following steps 301 through 304.

In step 301, a current training sample may be obtained. The current training sample may correspond to a sample entity and an attribute tag of the sample entity with respect to the preset transaction attribute.

In step 302, for each historical relational network of T historical relational networks sequentially arranged under the temporal order, a node vector fusion operation of a neighbor node may be executed to determine T description vectors corresponding to the sample entity under the T historical relational networks. The T historical relational networks being established under T time points may have the preset time interval.

In step 303, under the temporal order of the corresponding historical relational networks, the T description vectors may be sequentially inputted into a selected time-series neural network, and an output sample result of the time-series neural network may be obtained for a current sample entity.

In step 304, with the objective of matching the output sample result with the attribute tag, model parameters may be adjusted to train the time-series neural network.

In step 301, the current training sample, corresponding to the sample entity and the attribute tag of the sample entity with respect to the preset transaction attribute, may be obtained. In a supervised machine learning model training process, training samples may be divided into multiple batches, and one model parameter adjustment operation may be performed for each batch. One batch of training samples may be one training sample or multiple training samples, which is not limited by the embodiments herein. The current training sample may be the training sample of the current batch. The term "current" in the current batch may correspond to the current process. The current batch may be any batch.

One training sample may correspond to one piece of entity data. In the case that the sample entity is a sample user, one piece of entity data may indicate one sample user and a historical attribute tag of the sample user on the preset transaction attribute. The term "historical attribute tag" is used herein because, for the training sample, the corresponding attribute state or attribute category of the sample entity on the preset transaction attribute is already available.

Then, in step 302, for each historical relational network in the T historical relational networks arranged under temporal order, the node vector fusion operation of a neighbor node may be performed to determine the corresponding T description vectors of the sample entity under the T historical relational networks. T is an integer greater than 1.

Each historical relational network may describe the instantaneous state of each entity at the corresponding historical time point. In order to predict, from entity states corresponding to the T historical time points, the attribute state (e.g., a scaled income number) or attribute category (e.g., the gender attribute category being male) of the sample entity on the preset transaction attribute, mining previous state information before the corresponding attribute state or attribute category on the preset transaction attribute is acquired by the user is required. Therefore, the T historical relational networks of the sample entity are established at the T historical time points prior to the generation of the attribute tag. Since the relational network closer to the time that the sample entity generates the attribute tag can reflect the potential attribute state or attribute category of the sample entity better, in some embodiments, the historical time point corresponding to the T-th historical relational network thus does not differ from the generation time of the attribute tag of the sample entity by a preset time threshold.

In one embodiment, the sample entity and the attribute tag of the sample entity on the preset transaction attribute may be determined first. Then, the T historical relational networks may be established per a preset time interval by counting backward. For example, the time instance corresponding to the attribute tag of the sample entity may be Jun. 1, 2020, the preset time threshold may be 1 week, and the preset time interval may be 1 month. Then, a time point within the period of one week before Jun. 1, 2020 may be selected as the T-th historical time point, e.g., May 31, 2020.

The (T−1)-th historical time points may be selected by counting backward using the preset time interval, e.g., selecting T−1 time points including Apr. 30, 2020, Mar. 31, 2020, etc. Corresponding relational networks may be respectively established for the T time points, including the T-th time point and the T−1 time points. The manner of establishing a relational network has been described above and will not be further elaborated herein.

In some embodiments, the relational network at each time point may also be pre-established under a time interval. For example, the 15th of every month may be taken as a time point for establishing corresponding relational networks under a time interval of 1 month. After the time instance corresponding to the attribute tag of the sample user is determined, T corresponding historical relational networks may be selected under the order of the corresponding historical time points from the closest to the most distant in time.

Further, for each of the T historical relational networks, one description vector may be determined under the manner described above, which yields T description vectors. Since the T historical relational networks are arranged under the temporal order, these T description vectors may also have time-series characteristics. If there are multiple current sample entities, the attribute tags corresponding to these multiple sample entities may have different time instances, so each of the sample entities may correspond to its own attribute tag time instance. Similarly, each sample entity may correspond to its own T historical relational networks and T description vectors.

One graph neural network may process the T historical relational networks. Alternatively, T graph neural networks may respectively process the T historical relational networks. This specification is not limited in this regard. Processing a relational network with a graph neural network has been described above and will not be further elaborated herein.

Then, in step 303, under the temporal order of the corresponding historical relational networks, the T description vectors may be sequentially inputted into a selected time-series neural network to obtain a sample output result of the time-series neural network for the sample entity.

The time-series neural network can process data having time-series characteristics. For one exemplary training sample, the to-be-processed data may be T description vectors arranged under the time series. The time-series neural network may include one or more neurons, which may respectively receive the T description vectors at T different time instances. One output result may be obtained through the processing manner described above. The output result referred may correspond to the above-described sample entity, and therefore may be called the sample output result. The sample output result may be an output result obtained after the above-described one or more neurons having processed the T-th description vector or may be a processing result obtained by combining T output results, which is not limited by the embodiments herein.

The output result may be a vector or a score (a scaler). The sample output result herein may indicate a prediction result of the time-series neural network for the attribute state or attribute category of the sample entity on the preset transaction attribute. In the case that a batch of training samples includes multiple sample entities, a prediction result of the attribute state or attribute category on the preset transaction attribute may be obtained for each of the sample entities.

Then, in step 304, with the objective of matching the output sample result with the attribute tag, model parameters may be adjusted to train the time-series neural network, according to the form of the output sample result and the attribute tag. The consistency between these two may be described by a vector or a numerical value.

In some embodiments, in the case that the sample output result is a vector, the similarity level between the vector corresponding to the corresponding attribute tag and the vector of the sample output result (e.g., a similarity level expressed by the dot product of the vectors) may describe the consistency between the sample output result and the sample attribute tag.

In some embodiments, in the case that the sample output result is a score, the similarity level between these two may be described as the absolute difference between the score corresponding to the sample attribute tag and the score of the sample output result. Generally, a smaller absolute difference indicates a greater similarity level between the sample attribute tag and the sample output result.

If the sample output result contradicts the attribute tag, then the difference between them may be defined as a loss, which may be described by a model parameter. The time-series neural network may be trained by adjusting the model parameters to reduce the loss.

In some embodiments, the sample output result may be a score. Sequential adjustment operations of the model parameters may be performed based on a batch of training samples, including multiple sample entities, and the loss may be determined in the form of cross-entropy.

In some embodiments, take the binary classification result (which may correspond to a standard value of 0 or 1) as an example, the loss L may be determined by:

$$\mathcal{L} = -\frac{1}{|V|} \sum_{u \in V} y_u \log(h_u) + (1 - y_u)\log(1 - h_u)$$

where V represents the sample entity sets respectively corresponding to the training samples of the current batch. $h_u$ represents the output score corresponding to node u (or sample entity u), and $y_u$ represents the attribute tag corresponding to node u (such as sample user u). In the case that the binary classification result is represented by 0 or 1, one of $y_u$ or $1-y_u$ is 0. Using $y_u$ being 0 as an example, then $y_u \log(h_u)$ is 0, and $1-y_u$ is 1. Therefore, the closer $h_u$ to 1, the closer $\log(1-h_u)$ to 0, and the smaller the loss. The closer $h_u$ to 0, the closer $\log(1-h_u)$ to negative infinity, and the greater the loss. The loss is negatively correlated with $h_u$. The same reasoning may be applied to the case of $y_u$ being 1, which will not be further elaborated herein.

In some embodiments, in step 302, the parameters involved in the node vector fusion operation of the neighbor node executed for each historical relational network in the T historical relational networks may also need to be adjusted. Therefore, the node fusion operation may be combined with the time-series neural network to form an integrated machine learning model, and the model parameters may be adjusted according to the above-described loss.

Figure 4:
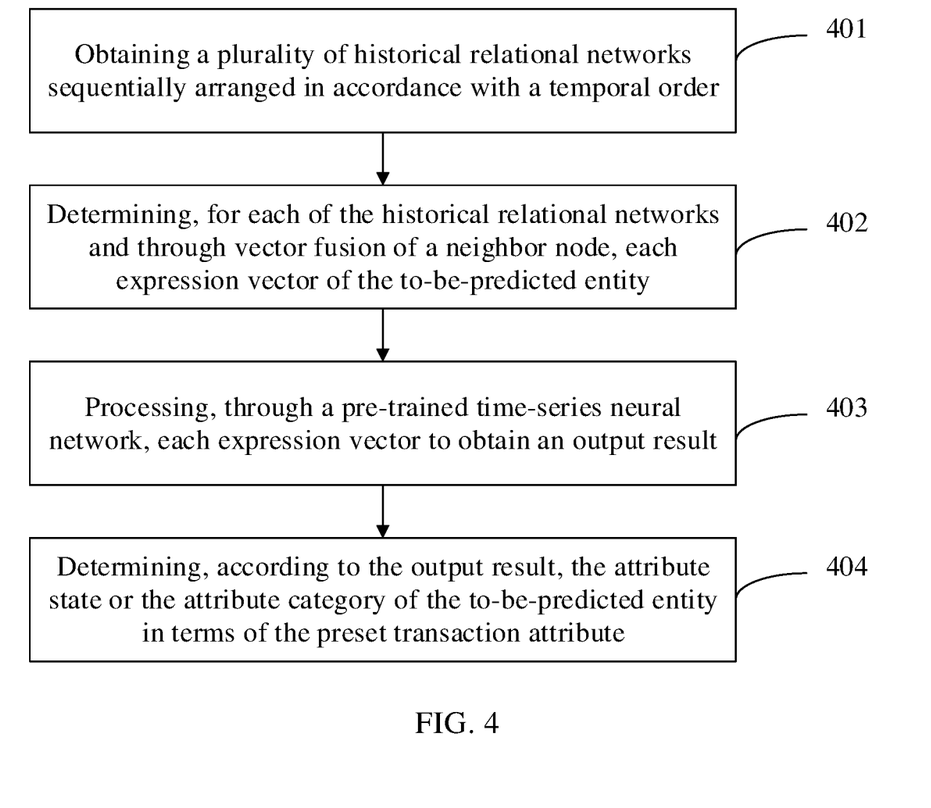
FIG. 4 illustrates a flowchart of an entity transaction attribute determination method according to some embodiments.

FIG. 4 illustrates the process of determining an entity transaction attribute according to some embodiments of this specification. This process is used for determining, through a plurality of historical relational networks based on a temporal order, an attribute state or an attribute category of a to-be-predicted entity on a preset transaction attribute.

The entity executing this process may be a computer, device, or server having certain computing capabilities. The preset transaction attribute of the to-be-predicted entity has a temporal characteristic (i.e., time-sensitive). In other words, the attribute state or attribute category of the preset transaction attribute is valid for a certain time point or time period.

In some embodiments, an income transaction attribute of a user in a performance-based salary system may only be valid for a certain month. A loan overdue risk transaction attribute of a user in the credit financing field may also be only valid for the current month or even be valid only up to the payment due date.

As shown in FIG. 4, the process of determining a transaction attribute of a to-be-predicted entity may comprise the following steps 401 through 404.

In step 401, a plurality of historical relational networks sequentially arranged under a temporal order may be obtained. The historical relational networks may respectively correspond to historical time points having a preset time interval. Each of the historical relational networks may comprise a plurality of nodes, and each node may correspond to a plurality of entities comprising the to-be-predicted entity. Each of the historical relational networks may be configured to describe association relationships between various entities that correspond to a corresponding historical time point. Entities having an association relationship may be connected by a connecting edge therebetween, and each node corresponds to a node vector composed of transaction characteristics extracted based on descriptive information of the corresponding entities.

In step 402, for each of the historical relational networks and through vector fusion of the neighbor nodes, each description vector of the to-be-predicted entity may be determined.

In step 403, through a pre-trained time-series neural network, each description vector may be processed to obtain an output result.

In step 404, according to the output result, the attribute state or the attribute category of the to-be-predicted entity on the preset transaction attribute may be determined.

In step 401, the multiple historical relational networks sequentially arranged under the temporal order may be obtained. Each of the historical relational networks may include multiple nodes. Each node may correspond to multiple entities. These entities may include the to-be-predicted entity. These entities may belong to the same category as the to-be-predicted entity or related categories.

In some embodiments, in the case that the to-be-predicted entity is a user, the multiple entities in an individual relational network may include multiple users and multiple other entities associated with the user, such as an APP installed on a user device, an IP address for a user device to access the network, etc. An individual historical relational network may be configured to describe the association relationships between various entities at the corresponding historical time point. The entities having an association relationship may be connected by a connecting edge therebetween. Each node may correspond to a node vector composed of transaction characteristics extracted based on the corresponding descriptive information. The construction process of the relational network has been described above, which will not be further elaborated.

Because the preset transaction attribute of the to-be-predicted entity has a temporal characteristic, the multiple historical relational networks herein may be associated with the temporal characteristic of the to-be-predicted transaction attribute. The multiple historical relational networks herein may be relational networks respectively corresponding to multiple historical time points close to the current time.

These historical time points may be selected under a preset time interval. In order to ensure validity, the time difference between the last historical time point and the current time may not exceed a preset time threshold.

The multiple historical relational networks may be pre-established under the preset time interval and may be selected according to the temporal characteristic when the process in FIG. 4 is executed. Alternatively, the multiple historical relational networks may be established by selecting multiple historical time points at the instant when the process in FIG. 4 is executed. The number of historical relational networks herein may be preset, for example, as T or other values in the process in FIG. 3. Determining the multiple historical relational networks is similar to that described in step 302 and will not be further elaborated herein.

Then, in step 402, for each of the historical relational networks and through vector fusion of a neighbor node, each description vector of the to-be-predicted entity may be determined. The vector fusion of the neighbor nodes has been described above and will not be further elaborated herein.

Then, in step 403, through a pre-trained time-series neural network, each description vector may be processed to obtain an output result. In step 403, a time-series neural network having the model parameter(s) adjusted by the process in FIG. 3 may sequentially process each description vector under the temporal order of each historical time point corresponding to each historical relational network, thereby obtaining the output result of the time-series neural network. The output result may be output after the neurons of the time-series neural network have processed the last description vector or an outputted fusion result after each description vector has been processed, which is not limited by the embodiments herein.

In addition, the output result of the time-series neural network may be a vector or a score. In one example, a binary classification task may output a score to indicate the probability of being classified into a certain category. In another example, each category may be represented by a vector, and the similarity level between the output vector and each category vector may describe the category likelihood. In yet another example, the output result may be a vector that can be mapped to an exemplary classification category through the processing of a fully connected network processing. Various similar examples exist but are not elaborated herein.

Furthermore, in step 404, according to the output result, the attribute state or the attribute category of the to-be-predicted entity on the preset transaction attribute may be determined. The output result of the time-series neural network may be a vector or a score according to the description of step 403. Corresponding to the output result, the manner of determining the preset transaction attribute of the to-be-predicted entity according to the output result may be as follows.

In one embodiment, the output result for a binary classification task may be a score indicating the probability of being classified into a certain category. Then, the attribute state or attribute category of the to-be-predicted entity on the preset transaction attribute during a preset time period may be determined according to a preset score threshold.

In another embodiment, each category may be represented by a vector. The similarity level between the output vector and each category vector may describe the category likelihood. Then, an attribute state or attribute category corresponding to the category vector having the highest similarity level with the output vector may be determined as the attribute state or attribute category of the to-be-predicted entity on the preset transaction attribute.

In yet another embodiment, the output result may be a vector, which may be processed by a fully connected network to map the vector to an exemplary classification category.

In some embodiments, other manners may be adopted to determine, according to the output result, the attribute state or attribute category of the to-be-predicted entity on the preset transaction attribute during the preset time period. For example, the preset transaction attribute may be the scaled income number, the output result may be a score, and different scores may correspond to different scaled income numbers (e.g., a score of 5 may correspond to an income of 5,000 RMB, etc.).

To sum up the above process, on the one hand, the method provided by the embodiments of this specification may process description vectors of a to-be-predicted entity at different historical time points through a time-series neural network to take into account time-series characteristics of the to-be-predicted entity. On the other hand, node vector aggregation of neighbor nodes may be performed for the description vector of a single time point based on a relational network determined under corresponding entity states at the corresponding historical time points, fully considering influences from other entities associated with the to-be-predicted entity on the entity state, thereby generating a description vector having a better descriptive capability for the to-be-predicted entity. Such a description vector having the time-series characteristic and the characteristics of being fused with neighbor nodes may fully exploit the influences of environmental changes on entity attributes, thereby improving the accuracy of predicting entity transaction attributes.

According to another aspect, an entity transaction attribute determination apparatus is further provided. The apparatus may be used for determining, through a plurality of historical relational networks based on a temporal order, an attribute state or an attribute category of a to-be-predicted entity on a preset transaction attribute.

Figure 5:
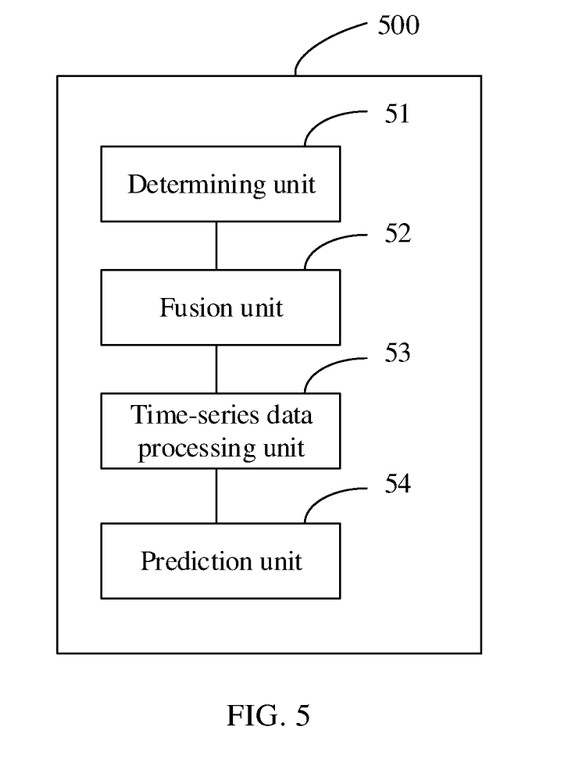
FIG. 5 illustrates a schematic block diagram of an entity transaction attribute determination apparatus according to some embodiments.

As shown in FIG. 5, an entity transaction attribute determination apparatus 500 may comprise a determining unit 51, a fusion unit 52, a time-series data processing unit 53, and a prediction unit 54.

The determining unit 51 may be configured to obtain a plurality of historical relational networks sequentially arranged under a temporal order, wherein the historical relational networks respectively correspond to historical time points having a preset time interval. Each of the relational networks may include a plurality of nodes, and each node may correspond to a plurality of entities comprising the to-be-predicted entity. Each of the historical relational networks may be configured to describe association relationships between the plurality of entities that correspond to a corresponding historical time point. The entities having an association relationship may be connected by a connecting edge therebetween, and each node may correspond to a node vector composed of transaction characteristics extracted based on descriptive information of the corresponding entities.

The fusion unit 52 may be configured to determine, for each of the relational networks and through vector fusion of neighbor nodes, a plurality of description vectors of the to-be-predicted entity.

The time-series data processing unit 53 may be configured to process, through a pre-trained time-series neural network, the description vectors to obtain an output result.

The prediction unit 54 may be configured to determine, according to the output result, the attribute state or the attribute category of the to-be-predicted entity on the preset transaction attribute.

In some embodiments, the transaction characteristics in the node vector corresponding to a single node are extracted through descriptive information at a corresponding historical time point of a corresponding relational network, or extracted through descriptive information within a time interval between the corresponding historical time point and a previous historical time point of the corresponding relational network.

In some embodiments, in the case that the to-be-predicted entity is a user, the entities in each of the historical relational networks may include a plurality of users and at least one of: an IP identifier or a WIFI identifier for a user device to access a network, and an application installed on the user device.

In some embodiments, the historical relational networks may include a first relational network. The to-be-predicted entity may correspond to a first node in the first relational network.

The fusion unit 52 may be further configured to process the relational network through a multilayer graph neural network. The multilayer graph neural network may update, after processing of a current layer is done, the node vector of the first node based on a weighted result from a product of the node vector of each neighbor node updated by the previous layer and an auxiliary weight matrix. The fusion unit 52 may be further configured to use the node vector of the first node updated by the last layer of the graph neural network as a first description vector of the first node corresponding to the first relational network.

In some embodiments, the neighbor nodes of the first node may include a second node, and at the current layer, the fusion unit 52 may be further configured to determine a weight of the second node relative to the first node by an exponential form-based normalization result of a similarity level between the node vector of the first node updated by the previous layer and the node vector of the second node updated by the previous layer, relative to a sum of similarity levels between the node vector of the first node updated by the previous layer and the node vector of each of the neighbor nodes updated by the previous layer.

In some embodiments, the fusion unit 52 may be configured to determine the similarity level between the node vector of the first node updated by the previous layer and the node vector of the second node updated by the previous layer by: concatenating the node vector of the first node updated by the previous layer and the node vector of the second node updated by the previous layer to form a concatenation vector; performing, through a spatial auxiliary weight matrix, a dimensionality reduction process on the concatenation vector to obtain an intermediate vector having preset dimensions; and processing, through an auxiliary vector having the preset dimensions, the intermediate vector to obtain the similarity level between the node vector of the first node updated by the previous layer and the node vector of the second node updated by the previous layer.

In some embodiments, the prediction unit 54 may be further configured to: process the output vector through a fully connected neural network; and determine, through the obtained processing result, the attribute state or the attribute category of the to-be-predicted entity on the preset transaction attribute.

In some embodiments, the output result may be an output vector, and attribute states or attribute categories of the to-be-predicted entity on the preset transaction attribute may further respectively correspond to description vectors. The prediction unit 54 may be further configured to: determine respective corresponding similarity levels between the output vector and each of the description vectors; and determine an attribute state or attribute category corresponding to a description vector having the highest similarity level as the attribute state or attribute category of the to-be-predicted entity on the preset transaction attribute during a preset time period.

The apparatus 500 in FIG. 5 may be an apparatus embodiment corresponding to the method embodiment in FIG. 4, and the corresponding description for the method embodiment in FIG. 4 also applies to the apparatus 500, which is not further elaborated.

According to another aspect, a computer-readable storage medium is further provided and has a computer program stored thereon, and when the computer program is executed in a computer, the computer is caused to execute the method described with FIG. 3 or FIG. 4.

According to yet another aspect, a computing device is further provided. The computing device may include a memory and a processor, wherein executable code is stored in the memory. When executing the executable code, the processor may implement the method described with FIG. 3 or FIG. 4.

According to yet another aspect, an entity transaction attribute determination apparatus is provided. The apparatus may include a processor and a non-transitory computer-readable memory coupled to the processor. The computer-readable memory may be configured with instructions executable by the processor to perform any of the entity transaction attribute determination methods described above.

According to yet another aspect, a non-transitory computer-readable storage medium is provided. The storage medium may have instructions stored thereon executable by a processor to cause the processor to perform any of the entity transaction attribute determination methods described above.

One skilled in the art should appreciate that in one or more of the above-mentioned examples, the functions described in the embodiments of this specification may be implemented by hardware, software, firmware, or any combination thereof. When implemented by software, these functions may be stored in a computer-readable medium or transmitted as one or more instructions or code on the computer-readable medium.

The exemplary implementations described above illustrate, in further detail, the objective, technical solutions, and beneficial effects of the technical concept of this specification. It should be appreciated that the above are some implementations of the technical concept of this specification and is not used to limit the protection scope of the technical concept of this specification. Any modification, equivalent alternatives, improvement made based on the technical solutions of the embodiments of this specification shall fall within the protection scope of the technical concept of this specification.

What is claimed is:

1. A method for entity transaction attribute determination, comprising:
obtaining a plurality of historical relational networks sequentially arranged under a temporal order, wherein the historical relational networks respectively correspond to historical time points having a preset time interval, each of the historical relational networks comprises a plurality of nodes, each node corresponds to a plurality of entities comprising the to-be-predicted entity, each of the historical relational networks is configured to describe association relationships between the plurality of entities corresponding to a corresponding historical time point, and each node corresponds to a node vector composed of transaction characteristics extracted based on descriptive information of the corresponding entities;

determining, for each of the historical relational networks and through vector fusion of neighbor nodes, a plurality of description vectors of the to-be-predicted entity;

processing, through a pre-trained time-series neural network, the description vectors to obtain an output result; and determining, according to the output result, an attribute state or an attribute category of a preset transaction attribute for a to-be-predicted entity.

2. The method of claim 1, wherein the time-series neural network is trained by:

obtaining a current training sample corresponding to a sample entity and an attribute tag of the sample entity regarding the preset transaction attribute;

executing, for each historical relational network of T historical relational networks sequentially arranged under the temporal order, a node vector fusion operation of the neighbor nodes, to determine T description vectors respectively corresponding to the sample entity under the T relational networks, wherein T is an integer, and the T historical relational networks are established under T time points having the preset time interval;

sequentially inputting, under the temporal order of the corresponding historical relational networks, the T description vectors into a selected time-series neural network, and obtaining a sample output result of the time-series neural network for the sample entity; and adjusting, with an objective of matching the sample output result with the attribute tag, model parameters to train the time-series neural network.

3. The method of claim 1, wherein the transaction characteristics in the node vector corresponding to a single node are extracted through descriptive information at a corresponding historical time point of a corresponding relational network, or extracted through descriptive information within a time interval between the corresponding historical time point and a previous historical time point of the corresponding relational network.

4. The method of claim 1, wherein the to-be-predicted entity is a user, the entities in each of the historical relational networks comprise a plurality of users and at least one of:

an IP identifier or a WIFI identifier for a user device to access a network, and an application installed on the user device.

5. The method of claim 1, wherein the historical relational networks comprise a first relational network, the to-be-predicted entity corresponds to a first node in the first relational network, and the determining, for each of the historical relational networks and through vector fusion of the neighbor nodes, the plurality of description vectors of the to-be-predicted entity comprises:

processing the relational network through a multilayer graph neural network, the multilayer graph neural network updating, after processing of a current layer is done, the node vector of the first node based on a weighted result from a product of a node vector of each neighbor node updated by a previous layer and an auxiliary weight matrix; and using the node vector of the first node updated by the last layer of the graph neural network as a first description vector of the first node corresponding to the first relational network.

6. The method of claim 5, wherein the neighbor nodes of the first node comprise a second node, and at the current layer, a weight of the second node relative to the first node is determined by:

an exponential form-based normalization result of a similarity level between the node vector of the first node updated by the previous layer and the node vector of the second node updated by the previous layer, relative to a sum of similarity levels between the node vector of the first node updated by the previous layer and the node vector of each of the neighbor nodes updated by the previous layer.

7. The method of claim 6, wherein the similarity level between the node vector of the first node updated by the previous layer and the node vector of the second node updated by the previous layer is determined by:

concatenating the node vector of the first node updated by the previous layer and the node vector of the second node updated by the previous layer to form a concatenation vector;

performing, through a spatial auxiliary weight matrix, a dimensionality reduction process on the concatenation vector to obtain an intermediate vector having preset dimensions; and processing, through an auxiliary vector having the preset dimensions, the intermediate vector to obtain the similarity level between the node vector of the first node updated by the previous layer and the node vector of the second node updated by the previous layer.

8. The method of claim 1, wherein the output result is an output vector, the determining, according to the output result, the attribute state or the attribute category of the preset transaction attribute for the to-be-predicted entity comprises:

processing the output vector through a fully connected neural network; and determining, through an obtained processing result, the attribute state or the attribute category of the preset transaction attribute for the to-be-predicted entity.

9. The method of claim 1, wherein the output result is an output vector, the attribute states or attribute categories of the preset transaction attribute for the to-be-predicted entity further respectively correspond to description vectors, and the determining, according to the output result, the attribute state or the attribute category of the preset transaction attribute for the to-be-predicted entity comprises:

determining respective corresponding similarity levels between the output vector and each of the description vectors; and determining an attribute state or attribute category corresponding to a description vector having the highest similarity level as the attribute state or attribute category of the preset transaction attribute for the to-be-predicted entity during a preset time period.

10. An entity transaction attribute determination apparatus, comprising a processor and a non-transitory computer-readable memory coupled to the processor, and configured with instructions executable by the processor to perform operations, comprising:

obtaining a plurality of historical relational networks sequentially arranged under a temporal order, wherein the historical relational networks respectively correspond to historical time points having a preset time interval, each of the historical relational networks comprises a plurality of nodes, each node corresponds to a plurality of entities comprising a to-be-predicted entity, each of the historical relational networks is configured to describe association relationships between the plurality of entities corresponding to a corresponding historical time point, and each node corresponds to a node vector composed of transaction characteristics extracted based on descriptive information of the corresponding entities;

determining, for each of the historical relational networks and through vector fusion of neighbor nodes, a plurality of description vectors of the to-be-predicted entity;

processing, through a pre-trained time-series neural network, the description vectors to obtain an output result; and determining, according to the output result, an attribute state or an attribute category of the preset transaction attribute for the to-be-predicted entity.

11. The apparatus of claim 10, wherein the time-series neural network is trained by:

obtaining a current training sample corresponding to a sample entity and an attribute tag of the sample entity regarding the preset transaction attribute;

executing, for each historical relational network of T historical relational networks sequentially arranged under the temporal order, a node vector fusion operation of the neighbor nodes, to determine T description vectors respectively corresponding to the sample entity under the T relational networks, wherein T is an integer, and the T historical relational networks are established under T time points having the preset time interval;

sequentially inputting, under the temporal order of the corresponding historical relational networks, the T description vectors into a selected time-series neural network, and obtaining a sample output result of the time-series neural network for the sample entity; and adjusting, with an objective of matching the sample output result with the attribute tag, model parameters to train the time-series neural network.

12. The apparatus of claim 10, wherein the transaction characteristics in the node vector corresponding to a single node are extracted through descriptive information at a corresponding historical time point of a corresponding relational network, or extracted through descriptive information within a time interval between the corresponding historical time point and a previous historical time point of the corresponding relational network.

13. The apparatus of claim 10, wherein the to-be-predicted entity is a user, the entities in each of the historical relational networks comprises a plurality of users and at least one of:

an IP identifier or a WIFI identifier for a user device to access a network, and an application installed on the user device.

14. The apparatus of claim 10, wherein the historical relational networks comprise a first relational network, the to-be-predicted entity corresponds to a first node in the first relational network, and the determining, for each of the historical relational networks and through vector fusion of the neighbor nodes, the plurality of description vectors of the to-be-predicted entity comprises:

processing the relational network through a multilayer graph neural network, the multilayer graph neural network updates, after processing of a current layer is done, the node vector of the first node based on a weighted result from a product of the node vector of each neighbor node updated by the previous layer and an auxiliary weight matrix; and using the node vector of the first node updated by the last layer of the graph neural network as a first description vector of the first node corresponding to the first relational network.

15. The apparatus of claim 14, wherein the neighbor nodes of the first node comprise a second node, and at the current layer, a weight of the second node relative to the first node is determined by:

an exponential form-based normalization result of a similarity level between the node vector of the first node updated by the previous layer and the node vector of the second node updated by the previous layer, relative to a sum of similarity levels between the node vector of the first node updated by the previous layer and the node vector of each of the neighbor nodes updated by the previous layer.

16. The apparatus of claim 15, wherein the similarity level between the node vector of the first node updated by the previous layer and the node vector of the second node updated by the previous layer is determined by:

concatenating the node vector of the first node updated by the previous layer and the node vector of the second node updated by the previous layer to form a concatenation vector;

performing, through a spatial auxiliary weight matrix, a dimensionality reduction process on the concatenation vector to obtain an intermediate vector having preset dimensions; and processing, through an auxiliary vector having the preset dimensions, the intermediate vector to obtain the similarity level between the node vector of the first node updated by the previous layer and the node vector of the second node updated by the previous layer.

17. The apparatus of claim 10, wherein the output result is an output vector, the determining, according to the output result, the attribute state or the attribute category of the preset transaction attribute for the to-be-predicted entity comprises:

processing the output vector through a fully connected neural network; and determining, through an obtained processing result, the attribute state or the attribute category of the preset transaction attribute for the to-be-predicted entity.

18. The apparatus of claim 10, wherein the output result is an output vector, the attribute states or attribute categories of the preset transaction attribute for the to-be-predicted entity further respectively correspond to description vectors, and the determining, according to the output result, the attribute state or the attribute category of the preset transaction attribute for the to-be-predicted entity comprises:

determining respective corresponding similarity levels between the output vector and each of the description vectors; and determining an attribute state or attribute category corresponding to a description vector having the highest similarity level as the attribute state or attribute category of the preset transaction attribute for the to-be-predicted entity during a preset time period.

19. A non-transitory computer-readable storage medium having instructions stored thereon executable by a processor to cause the processor to perform operations comprising:

obtaining a plurality of historical relational networks sequentially arranged under a temporal order, wherein the historical relational networks respectively correspond to historical time points having a preset time interval, each of the historical relational networks comprises a plurality of nodes, each node corresponds to a plurality of entities comprising a to-be-predicted entity, each of the historical relational networks is configured to describe association relationships between the plurality of entities corresponding to a corresponding historical time point, and each node corresponds to a node vector composed of transaction characteristics extracted based on descriptive information of the corresponding entities;

determining, for each of the historical relational networks and through vector fusion of neighbor nodes, a plurality of description vectors of the to-be-predicted entity;

processing, through a pre-trained time-series neural network, the description vectors to obtain an output result; and determining, according to the output result, an attribute state or an attribute category of the preset transaction attribute for the to-be-predicted entity.

20. The non-transitory computer-readable storage medium of claim 19, wherein the time-series neural network is trained by:

obtaining a current training sample corresponding to a sample entity and an attribute tag of the sample entity regarding the preset transaction attribute;

executing, for each historical relational network of T historical relational networks sequentially arranged under the temporal order, a node vector fusion operation of the neighbor nodes, to determine T description vectors respectively corresponding to the sample entity under the T relational networks, wherein T is an integer, and the T historical relational networks are established under T time points having the preset time interval;

sequentially inputting, under the temporal order of the corresponding historical relational networks, the T description vectors into a selected time-series neural network, and obtaining a sample output result of the time-series neural network for the sample entity; and adjusting, with an objective of matching the sample output result with the attribute tag, model parameters to train the time-series neural network.

\* \* \* \* \*

UNITED STATES PATENT AND TRADEMARK OFFICE
CERTIFICATE OF CORRECTION

| | |
|---|---|
| PATENT NO. | : 11,227,217 B1 |
| APPLICATION NO. | : 17/358039 |
| DATED | : January 18, 2022 |
| INVENTOR(S) | : Daixin Wang et al. |

It is certified that error appears in the above-identified patent and that said Letters Patent is hereby corrected as shown below:

On the Title Page

Item (71) Applicant's city "Zhejiang" should read -- Hangzhou --.

Item (73) Assignee's city "Zhejiang" should read -- Hangzhou --.

Signed and Sealed this
Twenty-sixth Day of April, 2022

*Katherine Kelly Vidal*

Katherine Kelly Vidal
*Director of the United States Patent and Trademark Office*